United States Patent [19]

Knauer et al.

[11] Patent Number: 4,903,044

[45] Date of Patent: Feb. 20, 1990

[54] ARRANGEMENT FOR THE AUTOMATIC AND CORRECT POSITIONING WITH RESPECT TO TIME OF A RECORD CHART BUNDLE SERVING TO RECORD IN SEGMENTS IN A CONTINUOUS MANNER

[75] Inventors: Norbert Knauer, Trossingen; Benjamin Saeger; Josef Wangler, both of Villingen-Schwenningen; Norbert Helmschrott, Villingen-Schwenningen, all of Fed. Rep. of Germany

[73] Assignee: Mannesmann Kienzle GmbH, Villingen-Schwenningen, Fed. Rep. of Germany

[21] Appl. No.: 312,912

[22] Filed: Feb. 21, 1989

[30] Foreign Application Priority Data

Feb. 26, 1988 [DE] Fed. Rep. of Germany ....... 3806026

[51] Int. Cl.[4] ........................................ G01D 15/24

[52] U.S. Cl. ................................ 346/121; 346/137

[58] Field of Search ...................... 346/121, 124, 137

[56] References Cited

U.S. PATENT DOCUMENTS 3,699,557 10/1972 Kelch ................................ 346/137

3,781,906 12/1973 Carney ............................... 346/137

*Primary Examiner*—B. A. Reynolds

*Assistant Examiner*—Mark Reinhart

*Attorney, Agent, or Firm*—Toren, McGeady & Associates

[57] ABSTRACT

The arrangement, according to the invention, includes a positioning drive with which a record chart bundle is drivable in a recording movement direction when it is received on a centering pin which can be raised and lowered, an adjustable stop which rotates at the recording speed and compensates for an angular difference between the recording angle per record chart and a complete revolution of this record chart, a catch arm, which is formed on at the stop, cooperating in turn with a radial edge of a sector-shaped cut-out portion of the uppermost record chart in the bundle during the positioning, the sector shape being conventional in record chart bundles, and driving means which are active when a record chart bundle is positioned and which couple the record chart bundle with the recording drive, the driving means being rotatably supported at a web which is movable vertically at the centering pin.

10 Claims, 5 Drawing Sheets

( 20 )

( 24 )

( 0 )

ARRANGEMENT FOR THE AUTOMATIC AND CORRECT POSITIONING WITH RESPECT TO TIME OF A RECORD CHART BUNDLE SERVING TO RECORD IN SEGMENTS IN A CONTINUOUS MANNER

BACKGROUND OF THE INVENTION

The invention is directed to an arrangement for the automatic and correct positioning with respect to time of a record chart bundle serving to record in segments but in a continuous manner relative to the recording members of a recording device. The record chart bundle being driven synchronously with respect to time by a recording gear mechanism or running gear and the drive connection of the individual record charts of the record chart bundle, which are provided in each instance with a sector-shaped cut-out portion and are arranged so as to be staggered relative to one another, is gradually interrupted.

As is known, record chart bundles are used in an advantageous manner when a process, which is of interest in its context, is to be detected over a longer range of time or when a better resolution of the recordings is to be achieved within a determined recording time range than would be possible with a single record chart which is relatively limited in its recording capacity. A preferred example of the use of such record chart bundles is in tachographs whose operation is substantially simplified by means of inserting record chart bundles which allow e.g. a weekly recording.

The continuous recording over a longer period of time, which is the aim of the record chart bundle, is achieved in that the recording members slide down to the next record chart in the bundle after practically one revolution as a result of the sector-shaped cut-out portions of a record chart. Accordingly, continued recording is effected, without a gap in time, on a new blank record chart, while the inscribed record chart, which is connected with the last record chart in the recording sequence or with a blind plate or blank flange, e.g. by means of a paper strip, is severed in the course of the continued movement of the record chart bundle by means of a suitable severing device with respect to the technique by which the record chart bundle is connected, e.g. a knife, which likewise falls into the cut-out portion of the inscribed record chart and is then actuated between the inscribed record chart and the following record chart. As the process proceeds, the friction of the severed record chart with the remainder of the bundle, which continues to rotate, and with its bush which is securely connected with the blind plate, guides the severed record chart against a stationary stop.

If the recordings are to be effected in a synchronous manner with respect to time and for later evaluation, particularly visually, with a time reference, it is necessary in the event that the bundled record charts are provided with the same time scales, that is, when they are not also recorded or printed on during the recording, not only to drive the respective record chart bundle in a manner corresponding to the time scale, but also to position them correctly with respect to time in the recording device, i.e. it is necessary that the scale value corresponding e.g. to the current clock time be aligned with the record chart located on top of the record chart bundle on the recording line, that is, the line that the recording members record on when they are moved out.

In previously used recording devices in which record chart bundles are used as recording charts, the recording base and the recording means are freely accessible. A record chart bundle is placed on by hand by threading its bush on a centering pin constructed at the recording means, which are driven by the recording gear mechanism in a synchronous manner with respect to time, and is secured by means of a tensioning nut, after which it is correctly aligned with respect to time to the recording line or to a permanent marking on the device which is assigned to the recording line, respectively, by means of rotating the record chart bundle. Of course, such an alignment of the record chart bundle depends to a great extent on the personal conscientiousness of the user and is cumbersome and subject to error by necessity if it must be carried out under the work conditions prevailing in the driver's cab of a truck, for example.

In order to change this situation in a fundamental way, i.e. to facilitate handling and increase the accuracy of positioning the record chart bundle, and accordingly also to improve the acceptability of such a recording device, it is obvious to demand a recording device in which the record chart bundle is inserted into a pocket and the rest of the operation is effected automatically. A threading of the record chart bundle on a centering spike with an eccentric projection, as is customary in the receiving of individual record charts, is already ruled out because of the cylindrical bush of the record chart bundle, but also because the time scales of the record charts of the record chart bundle are offset relative to one another and the rate of rotation of the record chart bundle, i.e. the recording speed, is lower than a speed which is identical to the actual recording duration per record chart. However, it is conceivable that a marking be assigned to a determined scale value on every record chart of a record chart bundle, and that by setting the record chart bundle in rotation the record chart bundle is guided back by a corresponding time difference between the scale value of the marking and the current clock time when the marking is detected by means of a stationary sensor in such a way that the scale value corresponding to the current clock time coincides with the recording line. Such a solution is inappropriately costly on the one hand with respect to the required drive means and the electronic comparison device; and on the other hand, difficulties arise with respect to a slip-free carrying of the record chart bundle during the positioning movement because of the cylindrical bush of the record chart bundle.

SUMMARY OF THE INVENTION

Accordingly, it is an object of the present invention to provide an arrangement for positioning of record chart bundles provided with a cylindrical bush, which positioning is automatic and correct with respect to time. Which arrangement can be realized at an expenditure appropriate for series-produced devices and with a reliable operation.

The solution to this problem is characterized by a device which provides a positioning drive, which is independent of the recording gear mechanism, and drives the record chart bundle. The bundle is received and rotatably supported in a centering position on a centering pin which can be raised and lowered vertically relative to the recording support of the record chart bundle, at a rate of rotation which is greater than the recording speed, by a sensor which is assigned to the record chart bundle and rotates with the latter synchronously with respect to time. The sensor is controllable in such a way that after passing through a recording angle of a record chart it executes a movement around the residual angle at 360° in the direction of the recording movement of the record chart bundle. Driving means are also provided which couple the record chart bundle with the recording drive when it is located in a certain position determined by the sensor.

A preferred embodiment of the invention provides an adjustable stop which cooperates with a radial cut-out edge of a record chart of the record chart bundle.

In addition, the preferred embodiment is characterized by a ratchet mechanism which is arranged coaxially relative to the centering pin and is in connection with the recording gear mechanism and in which the adjustable stop is coupled via a springing member with a gear unit element which rotates at a rate corresponding to the recording area of the record chart with respect to time on the one hand, and on the other hand engages via a pawl, which is supported on it, with locking teeth formed at a gear unit element rotating at the actual recording speed. The pawl being assigned to a stationary control contour.

The advantage offered by the invention, particularly as regards the preferred embodiment, consists in that the extensively mechanical solution which has been found offers a high degree of protection against breakdown and can be produced at low cost and so as to be economically reproducable. Moreover, this solution is suitable both for a fully automatic feed-in of a record chart bundle, in which the record chart bundle is inserted through a slot in the front side of the recording device and must first be transported into the centering position prior to correct positioning with respect to time, and for a semi-automatic feed-in, in which the record chart bundle is brought into the centering position by means of "letting it fall" into a shaft or by means of insertion in a pocket and is inserted on the centering pin, e.g. indirectly by means of closing a cover or a folding lid. Another substantial characteristic of the present positioning arrangement is that a conventional record chart bundle can be used without modification.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
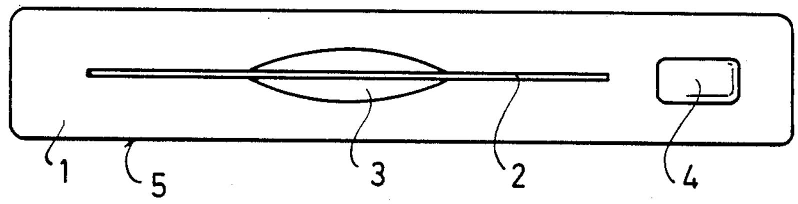
FIG. 1 shows a front view of a recording device with only one slot serving for the input of a record chart bundle.

FIG. 1 shows a relatively narrow front panel 1 which is arranged substantially in the plane of installation if the respective recording device is installed e.g. in a dashboard. A slot 2, in which record chart bundles are fed in and removed, and a recessed grip 3, which is assigned to the slot 2 and makes it easier to grip a record chart bundle, are constructed in the front panel 1. A button 4, which is preferably constructed as an illuminated button, serves to control the issuing of a record chart bundle located in the recording device. A lock which can actuate a locking mechanism assigned to the slot 2 can be assigned to the button 4 so that the recording device, whose housing is designated by 5, can only be operated by an authorized group of people.

Figure 2:
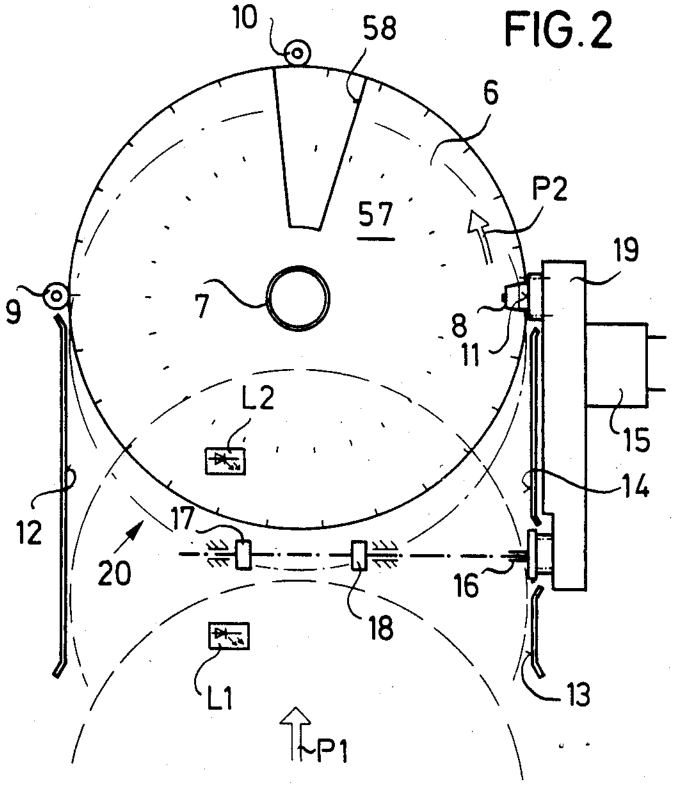
FIG. 2 shows an extensively schematic view of an arrangement for the automatic transporting of a record chart bundle into the centering position, and of the positioning drive.

According to FIG. 2, a record chart bundle 6, which is inserted in the direction of arrow P1 and is provided with a cylindrical bush 7, has already reached the centering position. In this position, the record chart bundle 6 is received on a centering pin, not shown in FIG. 2, which is arranged in such a way that it can be raised and lowered, and is driven in the circumferential direction P2 by a transporting roll 8. The record chart bundle 6 is guided into the centering position by guide rolls 9, 10 and by an end face 11 of a toothed wheel which is arranged coaxially with respect to the transporting roll 8. Front walls, which laterally define the guide shaft into which the record chart bundles are transported, are designated by 12, 13 and 14, while the light barriers assigned to the guide shaft are designated by L1 and L2.

A gear unit which guides the rotational movements of a motor 15 on the transporting roll 8 on the one hand and on a shaft 16 on the other hand, two transporting rolls 17, 18 being arranged on a shaft 16 so as to be spaced in such a way as to take into account the bush 7, is guided in a shared housing 19 which also receives the motor 15 and is assigned t the guide shaft as a structural unit.

If a record chart bundle 6 is inserted into the recording device, the locking mechanism of the slot 2, which can also be realized e.g. by means of a flap covering the slot 2, is first opened by means of actuating the button 4. In the event that a record chart bundle is located in the recording device, the raising of the recording members, the centering pin, the driving means and the severing device engaging between the record charts of the record chart bundle are triggered by means of actuating the button 4, and the motor 15 of the positioning drive is switched to feed out of the record chart bundle with a suitable time gap. The motor 15 of the positioning drive is switched off when the light barrier L1 is no longer interrupted, i.e. the record chart bundle projecting out of the slot 2 is removed from the recording device, or after a determined period of time has lapsed in case the bundle has not already been removed.

If the guide shaft is free, a new record chart bundle 6, i.e. one that has not been printed on, or also the recorded chart bundle 6 that has just been removed for checking, can be inserted and advanced up to the transporting rolls 17, 18. In so doing, the light barrier L1 is interrupted and the motor 15 of the positioning drive is actuated for drawing in a record chart bundle 6. In the position 20 shown in dashed lines, the inserted record chart bundle, which has been transported up to this point between the guide walls 12, 13, 14 of the guide shaft exclusively in a diametrical direction by means of the transporting rolls 17 and 18, is taken over by the transporting roll 8, guided into the centering position and driven in the circumferential direction. The subsequent lowering of the centering pin and the receiving of the record chart bundle 6 on the centering pin, respectively, can be effected by means of a switch which can be actuated in the centering position by means of the record chart bundle 6, or can also be effected already when the inserted record chart bundle 6 releases the light barrier L1 again during the drawing in. However, the lowering of the recording members and the severing device is only possible after the positioning process has been terminated and the record chart bundle 6 is coupled with the driving means which connect the record chart bundle 6 with the recording drive. These functions can be controlled by means of a pulse generator which is assigned to the transporting roll 8 and which no longer supplies pulses when the record chart bundle 6 is stopped, i.e. when the record chart bundle 6 is positioned. In an advisable manner, the friction between the transporting roll 8 and a counter-pressure roll assigned to the latter is also subsequently canceled in order to relieve the recording drive of the record chart bundle 6.

Of course, if the positioning of the record chart bundle is controlled by means of a microprocessor, it is conceivable to use various program loops in addition to the main program, which program loops serve to check the individual program steps and functions, e.g to trigger an interruption of the positioning process, if the record chart bundle is not positioned after a determined time period or a preset pulse number, the light barriers L1, L2 are not interrupted in the right sequence or remained interrupted, and the like.

Figure 3:
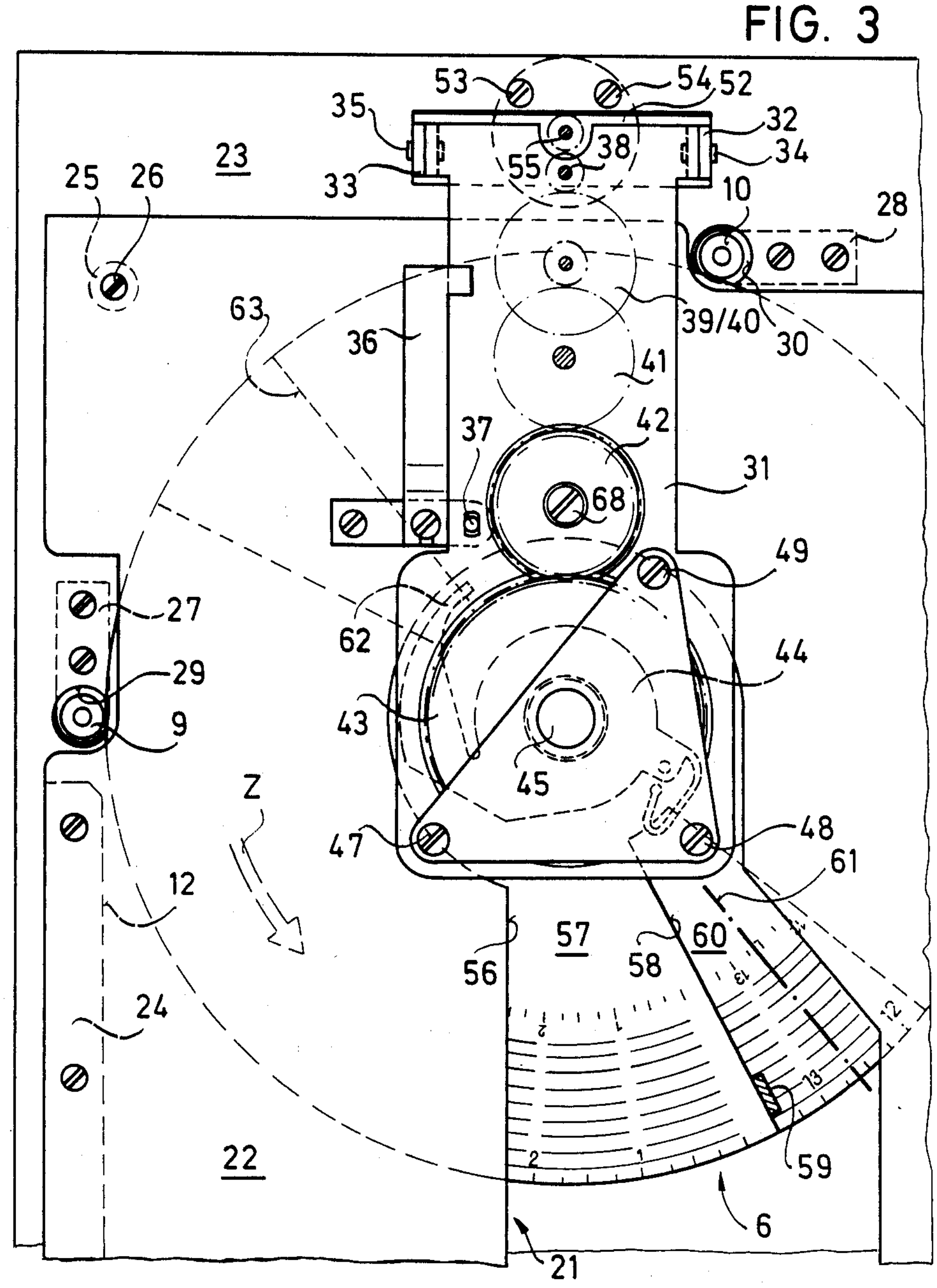
FIG. 3 shows a partial top view of the positioning arrangement according to the invention.

FIG. 3, which shows only a partial top view of the preferred embodiment of the positioning arrangement for the sake of simplicity, shows that a guide shaft 21 is substantially formed from two plates 22, 23 which are screwed together in a suitable manner, i.e. with the intermediary of strips 24 and washers 25. One of the utilized screws is designated by 26 by way of representation.

Figure 4:
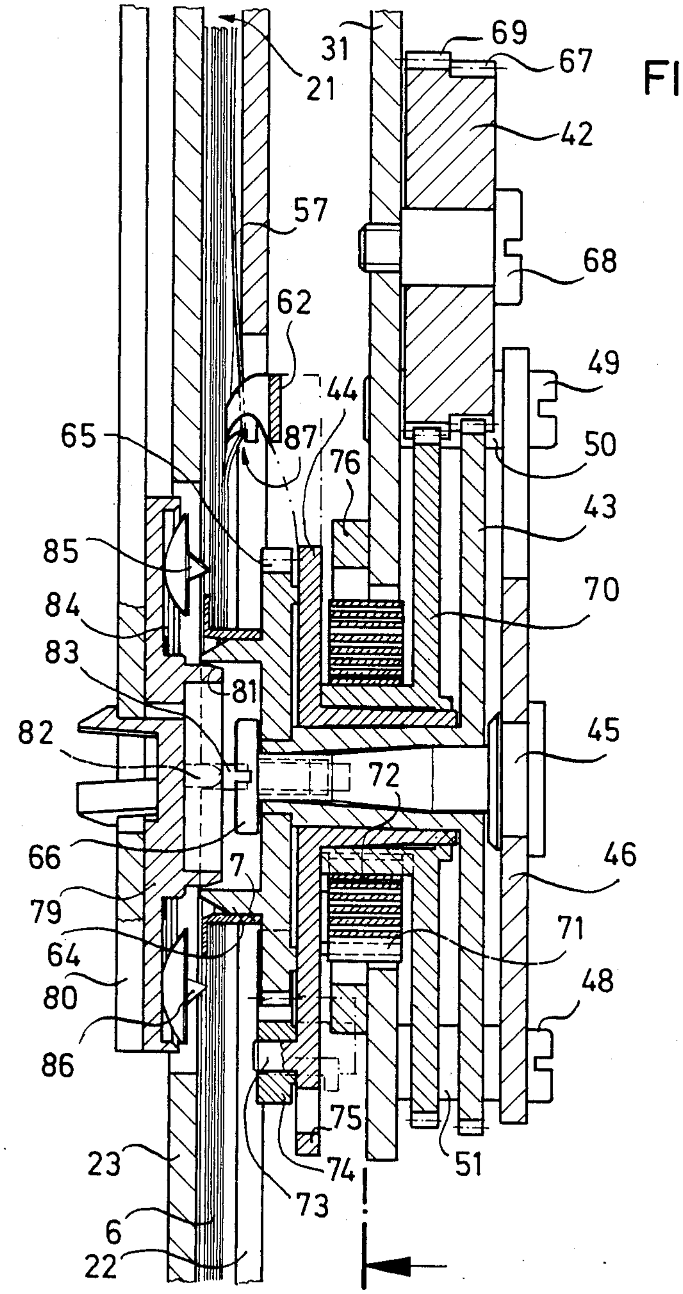
FIG. 4 shows a sectional view of the ratchet mechanism, according to the invention, and the centering and driving means assigned to the record chart bundle.

The guide rolls 9, 10 are rotatably supported on suitable carriers 27, 28 connected with the plate 23 and project through openings 29, 30 in the plate 23 and reliefs, not shown in more detail, in the plate 22 in the guide shaft 21 and between the plates 22, 23, respectively. One guide roll 10 defines the guide shaft 21 in the transporting direction and accordingly determines the centering position of the record chart bundle. The positioning drive 15, 16, 17, 18, 19, not shown in FIG. 3, is also assigned to the plates 22, 23 and connected with them in a suitable manner. In addition, an arm 31 is supported so as to be swivelable at the recording assembly which is constructed by means of the plates 22, 23 and is preferably designed as a plug-in unit. A bearing bracket which is formed on the arm 31 and not designated in more detail serves as a bearing, axles 34, 35, which are fastened in tabs which are formed on at the bottom plate 23, being assigned to the bearing bracket. The arm 31 is acted upon by a spring 36 and cooperates with a fastening pin 37 in a lowered position. Toothed wheels 38, 39/40, 41, 42, 43 of the recording gear mechanism and elements of a ratchet mechanism serving to position correctly with respect to time are arranged on the arm 31, which is actuable by means of an electromagnet or also by means of a motor, the ratchet mechanism acting on an adjustable stop 44. In order to lengthen the bearing axle 45 of the ratchet mechanism, a bridge supporting the bearing axle 45 is fastened at the arm 31 by screws 47, 48, 49 and suitable spacer bushes 50, 51 (FIG. 4). The drive of the recording gear mechanism is based on a motor (52 which is flanged on at the underside of the plate 23 and fastened by screws 53, 54. The motor shaft passes through the bottom plate 23, and the pinion 55, which is fastened on the motor shaft, engages in the area of the swiveling axis of the arm 31 with the toothed wheel 38 of the recording gear mechanism, the toothed wheel 38 being supported on the arm 31.

A recording state is shown in FIG. 3, in which the uppermost record chart 57 of the record chart bundle 6 which is visible through a cut-out portion 56 in the bottom plate 22 is already no longer connected with the bundle and contacts a stop 59 with one edge 58 of its sector-shaped cut-out portion. The stop 59, at which all record charts abut after a respective recording revolution, is assigned to a severing device, not shown, which can be raised and lowered and is constructed as a knife, in a manner known per se, if the individual record charts of the record chart bundle are connected with a base plate or the last record chart in the recording sequence, respectively, by means of paper strips. The following record chart 60, on which the recording members are active in the shown situation, can be seen through the cut-out portion of the uppermost record chart 57. For the sake of simplicity only the recording line 61, i.e. the line along which the recording members move when they are moved out, is shown in dash-dot lines.

As shown by FIG. 3, in addition, a springing catch arm 62 is formed on the adjustable stop 44 which revolves in the direction of arrow Z with the record chart bundle 6. This catch arm 62 lies on the uppermost record chart 57 during its revolution, but, according to the invention, its position is always such that the one edge, e.g. 63, of the respective following record chart 60 coincides with the base line of a notch 87 (FIG. 4) constructed on the front of the catch arm 62, i.e. it predetermines the correct position with respect to time for the respective record chart being recorded at that instant. If the record chart bundle is removed from the recording device, e.g. for purposes of monitoring, and the remaining bundle is inserted again, the record chart which now lies on top, or one of its cut-out edges, respectively, cooperates with the catch arm 62 during positioning and abuts in the base of the notch 87.

Figure 5:
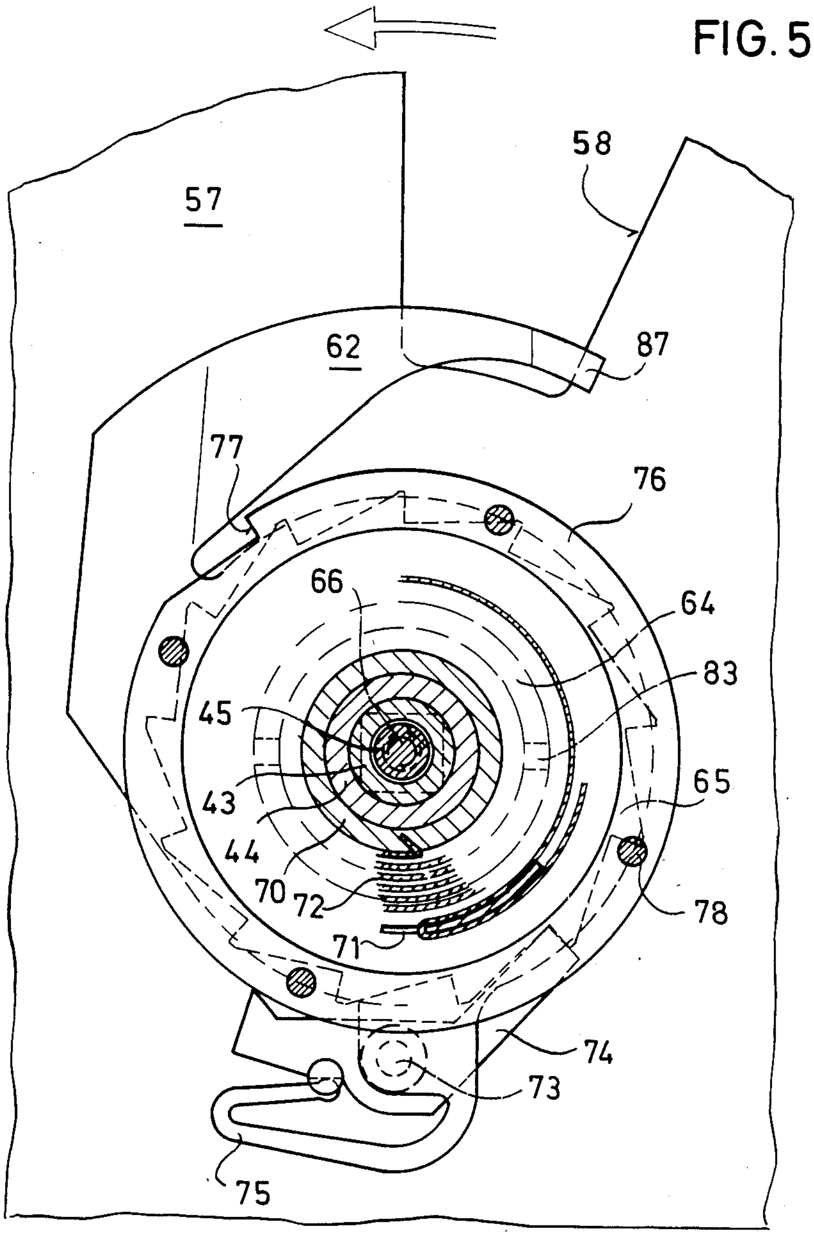
FIG. 5 shows a section along the section line x in FIG. 4.

FIGS. 4 and 5 show sections through the centering and driving means of the positioning arrangement and through the ratchet mechanism which controls offsetting of the adjustable stop 44 corresponding to mutual offsetting of the record charts within the record chart bundle and accordingly corresponding to the mutually offset time scales.

As can be seen from FIG. 4, the record chart bundle 6 is located in the guide shaft 21 formed by means of the plates 22, 23 and is received on a hollow centering pin 64 by means of the bush 7. The centering pin 64 is in turn formed on at the ratchet wheel 65 which is connected with a bush so as to be locked with respect to rotation relative to it, the bush being formed on at the toothed wheel 43 of the recording gear mechanism. The toothed wheel 43, which is supported on the axle 45 by means of the bush and is axially secured by a screw 66, engages with the one toothing 67 of the toothed wheel 42 of the recording gear mechanism, which toothed wheel 42 is constructed in two stages and is supported on a bearing screw 68. A toothed wheel 70, whose bush is supported on the bush of the adjustable stop 44, meshes with the other toothing 69 of the toothed wheel 42. The adjustable stop 44 is in turn supported on the bush of the toothed wheel 43 and is connected with one end of a tension spring 72 via a formed on rib 71. The other end of the tension spring 72 acts at the bush of the toothed wheel 70. Moreover, a pawl 74 is supported on an axle 73 formed on the adjustable stop 44. The pawl 74 engages with the ratchet wheel 65 on the one hand and is supported on the other hand at a contour 76 accompanied by the action of a spring arm 75 which is formed on at the adjustable stop 44. The contour 76, which is formed by a cylindrical ring until a cut-out portion 77 FIG. 5, is fastened to the arm 31 so as to be locked with respect to rotation relative to it by means of formed on pins, one of which is designated by 78.

The drive of the record chart bundle 6 which is supported on the centering pin 64 so as to be rotatable, is effected by means of a coupling plate 79 which is supported so as to be rotatable with a web 80 which is movable in the axial direction with reference to the centering pin 64. A centering projection 81 and at least one driver 82 are formed at the coupling plate 79, specifically in such a way that the centering projection 81 corresponds to the bore hole of the centering pin 64 and the driver 82 is assigned to a slot 83 arranged in the centering pin 64. In addition, the coupling plate 79 serves as a holder for a driving spring 84 which can be constructed with a plurality of arms or as a corrugated washer, driving tips 85, 86 being constructed at the latter. The driving tips 85, 86 penetrate into the base plate of the record chart bundle 6 when the web 80 is swiveled into its driving position.

Figure 6A:
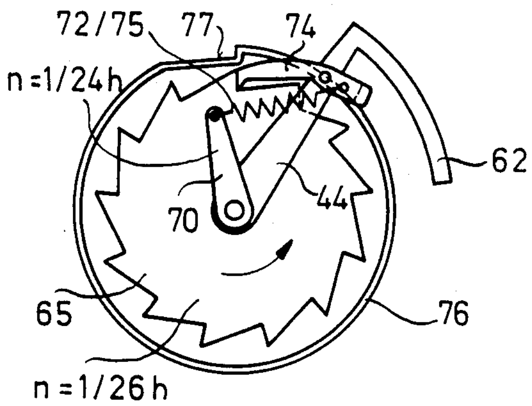
FIGS. 6 A, B, C show schematic views of the operating positions of a ratchet mechanism, according to the invention, for guiding back an adjustable stop correctly with respect to time, the adjustable stop being assigned to the record chart bundle.

The functioning of the ratchet mechanism is now explained in more detail with reference to FIGS. 6 A, B and C. FIG. 6A shows a position of the ratchet mechanism at 20.00 hours by way of example. The engagement of the pawl 74 in the toothing of the ratchet wheel 65 is locked as a result of the guiding of the pawl 74 at the stationary contour 76, the pawl 74 being supported on the adjustable stop 44, i.e. ratchet wheel 65, pawl 74 and adjustable stop 44 rotate at a rate of normally 1 revolution per 26 hours. In contrast, the toothed wheel 70, which is shown as a lever in FIG. 6 by way of substitution, is driven at a rate of 1 revolution per 24 hours, so that an advance is effected relative to the ratchet wheel 65, and the spring 72, which simultaneously takes over the function of the spring 75 in FIG. 6, is tensioned.

Figure 6B:
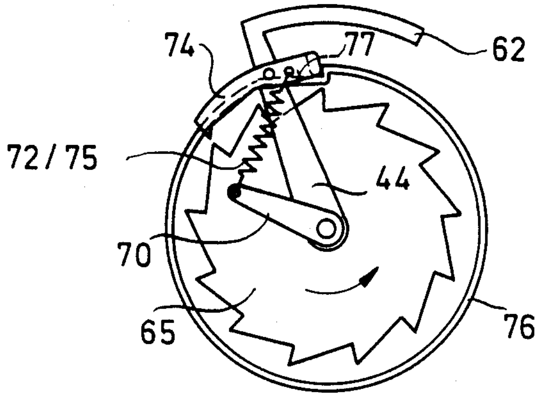

In the position corresponding to FIG. 6B, which designates 24.00 hours, the cut-out portion 77 in the contour 76 simultaneously allows a swiveling of the pawl 74 and a jumping forward of the adjustable stop 44 in the drive direction accompanied by the action of the spring 72. During the jumping forward, the pawl 74 is already guided back into the locking teeth again after one tooth spacing.

Figure 6C:
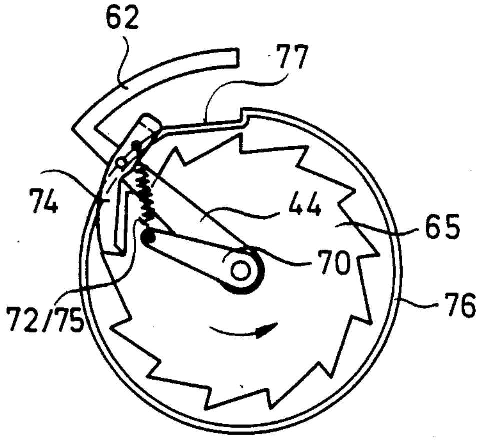

Until the time shown according to FIG. 6B, the catch arm 62 showed the zero-hour stop rotating with the record chart bundle 6, e.g. of the uppermost record chart 57. At this time, i.e. 24.00 hours, the recording members pass through the cut-out portion of the uppermost record chart 57 to the following record chart 60. When the adjustable stop 44 jumps forward, the catch arm 62, i.e. the zero-hour stop, is guided back by the amount corresponding to the offset of the time scale of the following record chart 60 and now serves as a zero-hour stop for this record chart, or that respective record chart which is being recorded on, respectively, and rotates until the next switching process at the rate of 1 recording revolution per 26 hours. In other words, the adjustable stop 44 is a mechanical sensor which constantly maintains a fixed relation to the same numerical value of every record chart of the record chart bundle following in the recording sequence (FIG. 6C).

The correct positioning of a record chart bundle 6 with respect to time is accordingly concluded when the record chart bundle 6, which is rotatably supported on the lowered centering pin 64 and is driven by the transporting roll 8 in the direction of the recording movement, is received by the catch arm 62 of the adjustable stop 44, i.e. one cut-out edge of the record chart lying on top in the record chart bundle 6 is located in the notch 87 of the catch arm 62. Subsequently, the web 80 is swiveled against the record chart bundle 6 and a slip-free connection is accordingly created between the record chart bundle 6 and the centering pin 64 driven by the recording gear mechanism. For the sake of completeness, it is mentioned here that, in the case of the shown embodiment, the coupling engagement 79 between the centering pin 64 and the coupling plate 79 can be completely separated only temporarily, i.e. for changing a record chart bundle 6, but, otherwise, also when no record chart bundle 6 is inserted, on the one hand a driving of the coupling plate 79 must be ensured, on the other hand the web 80 must be located in a position in which the tips are located outside the support surface of the record chart bundle 6.

While the invention has been illustrated and described as embodied in an arrangement for automatically correctly positioning a record chart bundle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An arrangement for automatic and correct positioning with respect to time of a record chart bundle which is recorded on in segments but in a continuous manner relative to recording members of a recording device comprising: recording gear means for driving the record chart bundle synchronously with respect to time, said gear means having a drive connection with individual record charts of the record chart bundle which is gradually interrupted, the individual record charts each having a sector-shaped cut-out portion and being arranged so as to be staggered relative to one another; a centering pin provided so as to receive and rotatably support the record chart bundle in a centering position, said pin being raisable and lowerable vertically relative to a recording base of the record chart bundle; positioning drive means independent of the recording gear means for driving the record chart bundle at a rate of rotation greater than a recording speed, said positioning drive means including a sensor provided so as to synchronously rotate with the record chart bundle with respect to time, said sensor being controllable so that after passing through a recording angle of a record chart it executes a movement around a residual angle at 360° in the direction of recording movement of the record chart bundle; and driving means for coupling the record chart bundle with a recording drive of the recording device when the bundle is located in a certain position determined by the sensor.

2. The arrangement according to claim 1, and further comprising an adjustable stop provided so as to cooperate with a radial cut-out edge of a record chart of the record chart bundle.

3. The arrangement according to claim 2, and further comprising a ratchet mechanism arranged coaxially relative to the centering pin and in a gear connection with the recording gear means, a first gear unit element rotatable at a rate corresponding to the recording area of a record chart of the record chart bundle with respect to time, a spring member provided so as to couple the adjustable stop with the first gear unit element, a second gear unit element having locking teeth and being rotatable at the actual recording speed, and a pawl assigned to a stationary control contour and supported on the adjustable stop so that the stop engages the locking teeth of the second gear unit element.

4. The arrangement according to claim 2, and further comprising a catch arm formed on the adjustable stop and provided so as to spring vertically relative to the record chart plane, the catch arm having a blade-shaped free end with a notch.

5. The arrangement according to claim 3, wherein the recording gear means includes toothed wheels, and further comprising an arm provided so as to be swivelable vertically relative to the recording base of the record chart bundle and so as to carry at least part of the toothed wheels of the recording gear means, the ratchet mechanism being supported at said arm, the centering pin being constructed at the second gear unit element, and the driving means, being swivelably supported on an opposite side of the recording base at a structural component part which is movable vertically relative to the recording base.

6. The arrangement according to claim 3, and further comprising a spring formed directly on the adjustable stop so as to cooperate with the pawl.

7. The arrangement according to claim 3, wherein the spring member, which acts at the adjustable stop, is formed directly on the first gear unit element.

8. The arrangement according to claim 1, and further comprising a transporting roll provided so as to transfer the positioning drive means to a record chart bundle received on the centering pin, and a standstill sensor assigned to the record chart bundle for interrupting the positioning drive means.

9. The arrangement according to claim 5, and further comprising a coupling element provided as driving means, the coupling element being rotatably supported at a swivelable arm and provided with tips which penetrate into the base plate of the record chart bundle when the centering pin is coupled with the record chart bundle.

10. The arrangement according to claim 1, and further comprising at least one marking arranged on the uppermost record chart of the record chart bundle, and a photoelectric sensor arranged on a swivelable carrier provided so as to execute a compensating movement in the direction of the recording movement of the record chart bundle during every revolution of the record chart bundle.

* * * * *